US012085936B2

(12) United States Patent
Ishii et al.

(10) Patent No.: US 12,085,936 B2
(45) Date of Patent: Sep. 10, 2024

(54) UTILITY VEHICLE

(71) Applicant: KAWASAKI MOTORS, LTD., Akashi (JP)

(72) Inventors: Hiroshi Ishii, Akashi (JP); Taro Iwamoto, Akashi (JP); Takeshi Nakajima, Akashi (JP); Kazuya Nagasaka, Kobe (JP); Atsushi Sano, Kobe (JP); Kazuhiro Ichikawa, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 32 days.

(21) Appl. No.: 17/927,356

(22) PCT Filed: May 28, 2020

(86) PCT No.: PCT/JP2020/021166
§ 371 (c)(1),
(2) Date: Nov. 22, 2022

(87) PCT Pub. No.: WO2021/240743
PCT Pub. Date: Dec. 2, 2021

(65) Prior Publication Data
US 2023/0213937 A1    Jul. 6, 2023

(51) Int. Cl.
*G05D 1/00* (2024.01)
*B64U 70/93* (2023.01)
(Continued)

(52) U.S. Cl.
CPC .......... *G05D 1/0088* (2013.01); *B64U 70/93* (2023.01); *B64U 80/86* (2023.01); *G05D 1/0276* (2013.01);
(Continued)

(58) Field of Classification Search
CPC .. G05D 1/0088; G05D 1/0276; G05D 1/0094; G05D 1/102; G05D 1/0282;
(Continued)

(56) References Cited

U.S. PATENT DOCUMENTS 6,712,312 B1    3/2004  Kucik
9,211,959 B2   12/2015  Teller et al.
(Continued)

FOREIGN PATENT DOCUMENTS

DE    102017130954 A1   6/2019
EP        3647493 A1   5/2020
(Continued)

*Primary Examiner* — Tyler D Paige
(74) *Attorney, Agent, or Firm* — Alleman Hall & Tuttle LLP (57) ABSTRACT

A utility vehicle includes: a travel structure including a front wheel, a rear wheel, a steering structure mounted to the front wheel, and a drive source that drives the front wheel and/or the rear wheel; circuitry that controls the travel structure to effect autonomous travel without manned operation in a given travel area; a route setter that sets a travel route for the autonomous travel; a vehicle location detector that detects a location of the utility vehicle; and a target detector that detects a monitoring target in the travel area. In case that the monitoring target is detected at a location during the autonomous travel, the circuitry stores the location of the monitoring target as history information. The route setter sets a reference point at the location where the monitoring target was detected and sets the travel route based on the reference point.

7 Claims, 6 Drawing Sheets

(51) Int. Cl.
*B64U 80/86* (2023.01)
*G08B 13/16* (2006.01)
*G08B 13/181* (2006.01)
*B64U 101/30* (2023.01)

(52) U.S. Cl.
CPC ...... *B64U 2101/30* (2023.01); *B64U 2201/10* (2023.01)

(58) Field of Classification Search
CPC .... B64U 70/93; B64U 80/86; B64U 2101/30; B64U 2201/10; G08B 13/1609; G08B 13/181; G08B 13/196; G08B 15/00; G01C 21/3407
USPC .......................................................... 701/23
See application file for complete search history.

(56) References Cited

U.S. PATENT DOCUMENTS

| | | | |
|---|---|---|---|
| 9,659,502 B1 | 5/2017 | Abebe et al. | |
| 10,514,690 B1* | 12/2019 | Siegel | G05D 1/0225 |
| 2003/0197612 A1 | 10/2003 | Tanaka et al. | |
| 2005/0166355 A1 | 8/2005 | Tani | |
| 2016/0196756 A1* | 7/2016 | Prakash | G06Q 10/083 |
| | | | 701/3 |
| 2019/0324468 A1 | 10/2019 | Liss | |
| 2020/0122830 A1* | 4/2020 | Anderson | B60L 50/60 |
| 2020/0132845 A1* | 4/2020 | Panas | G01S 7/4817 |
| 2020/0148348 A1* | 5/2020 | Bradley | B64U 10/60 |
| 2020/0275817 A1 | 9/2020 | Nordt et al. | |
| 2020/0341468 A1* | 10/2020 | Arima | G05D 1/0246 |
| 2023/0213937 A1* | 7/2023 | Ishii | B64U 70/93 |
| | | | 701/23 |

FOREIGN PATENT DOCUMENTS

| | | |
|---|---|---|
| JP | H05108930 A | 4/1993 |
| JP | 2001320538 A | 11/2001 |
| JP | 2006011596 A | 1/2006 |
| JP | 2008065439 A | 3/2008 |
| JP | 200890861 A | 4/2008 |
| JP | 2008117132 A | 5/2008 |
| JP | 2012078950 A | 4/2012 |
| JP | 2018111340 A | 7/2018 |
| JP | 2018139720 A | 9/2018 |
| JP | 2019016076 A | 1/2019 |
| JP | 2020013379 A | 1/2020 |
| JP | 2020502675 A | 1/2020 |

* cited by examiner

UTILITY VEHICLE

CROSS REFERENCE TO RELATED APPLICATIONS

This application is a national phase application of International Application No. PCT/JP2020/021166, filed on May 28, 2020, entitled UTILITY VEHICLE, the entire disclosure of which is incorporated herein by reference for all purposes.

TECHNICAL FIELD

The present disclosure relates to a utility vehicle.

BACKGROUND ART

A utility vehicle able to travel on rough terrain and the like is used for works such as conveyance of crops etc. and monitoring in premises. It is envisaged that such a work requires the vehicle to travel on a predetermined travel route and is routinely repeated.

In recent years, various kinds of technology for autonomous driving of automobiles have been proposed. For example, Patent Literature 1 discloses a system in which an autonomous driving vehicle travels on a predetermined travel route. This system eliminates the need for manned operation in travel on the predetermined travel route.

CITATION LIST

Patent Literature

PTL 1: Japanese Laid-Open Patent Application Publication No. 2020-13379

SUMMARY OF INVENTION

Technical Problem

Such a conventional autonomous driving vehicle as mentioned above leaves room for improvement in terms of use as a security vehicle for patrolling a given travel area. For example, in the autonomous driving vehicle of Patent Literature 1, the travel route is predetermined as stated above. In this case where the vehicle is allowed to travel on the predetermined travel route, the entire travel area can be monitored evenly. However, the efficiency of monitoring is reduced in a situation where the travel area is dotted with spots that should be guarded carefully.

It is therefore an object of the present disclosure to provide a utility vehicle capable of monitoring a given travel area efficiently.

Solution to Problem

A utility vehicle according to one aspect of the present disclosure includes: a travel structure including a front wheel, a rear wheel, a steering structure mounted to the front wheel, and a drive source that drives the front wheel and/or the rear wheel; circuitry that controls the travel structure to effect autonomous travel without manned operation in a given travel area; a route setter that sets a travel route for the autonomous travel; a vehicle location detector that detects a location of the utility vehicle; and a target detector that detects a monitoring target in the travel area, wherein in case that the monitoring target is detected at a location during the autonomous travel, the circuitry stores the location of the monitoring target as history information, and wherein the route setter sets a reference point at the location where the monitoring target was detected and sets the travel route based on the reference point.

Advantageous Effects of Invention

In accordance with the present disclosure, the travel route of the utility vehicle is set based on the history information of the location where the monitoring target was detected during autonomous travel of the utility vehicle. This makes it possible to set the travel route such that the location where the monitoring target was detected will be monitored carefully during autonomous travel. Thus, the given travel area can be monitored efficiently.

DESCRIPTION OF EMBODIMENTS

Hereinafter, exemplary embodiments will be described with reference to the drawings. The same or like elements are denoted by the same reference signs throughout the drawings and will not be described repeatedly.

Configuration of Vehicle

Figure 1:
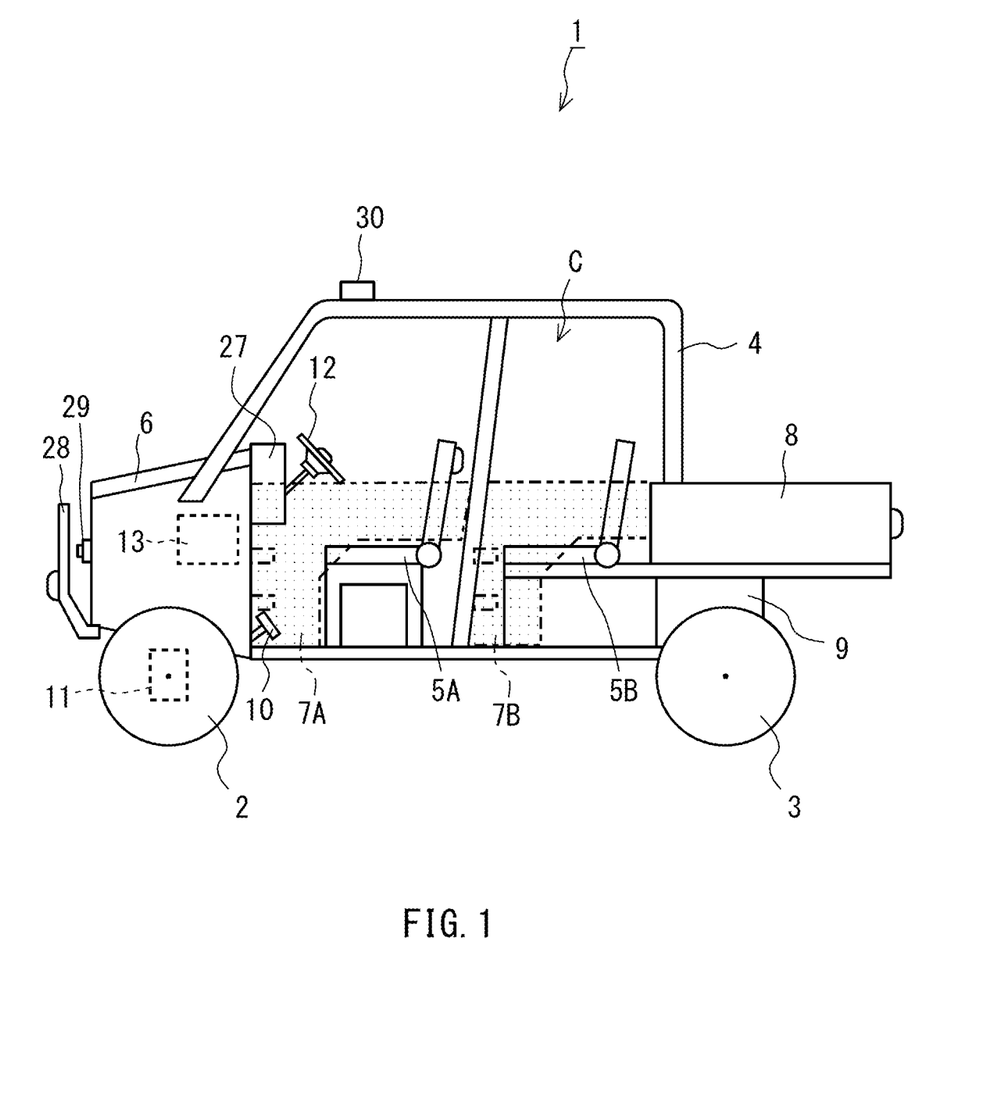
FIG. 1 is a schematic left side view showing a utility vehicle of an exemplary embodiment.

FIG. 1 is a schematic left side view showing a utility vehicle of an exemplary embodiment. The utility vehicle 1 (simply referred to as "vehicle 1" hereinafter) of FIG. 1 includes a pair of left and right front wheels 2 and a pair of left and right rear wheels 3. The front and rear wheels 2 and 3 support a vehicle body frame 4. The vehicle body frame 4 is a pipe frame constituted by pipes connected together.

The vehicle body frame 4 supports a front seat structure 5A and a rear seat structure 5B. The front seat structure 5A includes a driver seat. The seats are not limited to being arranged in two rows, and may be arranged in a single row. The vehicle body frame 4 encloses a cabin C including the front and rear seat structures 5A and 5B. That is, the cabin C is defined by the vehicle body frame 4. A hood 6 is located ahead of the cabin C (front seat structure 5A). The hood 6 is supported by the front of the vehicle body frame 4 and covers from above the space between the left and right front wheels 2. The hood 6 is openable.

Front side doors 7A are located to the left and right of the front seat structure 5A, and rear side doors 7B are located to the left and right of the rear seat structure 5B. The side doors 7A and 7B are supported by the vehicle body frame 4. Each of the side doors 7A and 7B opens and closes by pivoting relative to the vehicle body frame 4 about a pivot shaft located at the front end of the side door 7A or 7B. This allows occupants to get in or out of the vehicle 1. In FIG. 1, the side doors 7A and 7B are depicted as being see-through to show the space (cabin C) inside the side doors 7A and 7B.

A cargo bed 8 is located behind the cabin C (rear seat structure 5B). The rear of the vehicle body frame 4 supports the cargo bed 8. A drive source 9 supported by the vehicle body frame 4 is located beneath the cargo bed 8. The drive source 9 is, for example, an engine. Alternatively, the drive source 9 may be an electric motor or a combination of an engine and an electric motor. The drive source 9 drives the drive wheels (front wheels 2 and/or rear wheels 3).

A first operator 10 including an accelerator pedal and a brake pedal is located ahead of and below the driver seat (in the area around the feet of the driver). Operating the accelerator pedal produces a change in the drive power of the drive source 9. Unshown brakes are mounted to the front and rear wheels 2 and 3, and operating the brake pedal induces deceleration of the vehicle 1. Thus, the first operator 10 is configured as an operator for acceleration and deceleration of the vehicle 1.

A steering structure 11 is mounted to the front wheels 2. A steering wheel 12 as a second operator is located in front of the driver seat of the front seat structure 5A. The steering wheel 12 is connected to the steering structure 11. In response to an operation on the steering wheel 12, the steering structure 11 moves to steer the front wheels 2. Thus, the second operator is configured as an operator for turning of the vehicle 1.

The vehicle 1 further includes a transmission (not shown) located between and connected to the drive source 9 and the drive wheels. The transmission changes the gear ratio or the travel direction (forward or rearward) based on an operation on a third operator such as an unshown gear shift lever.

As described above, a travel structure 14 for travel of the vehicle 1 includes the front wheels 2, the rear wheels 3, the steering structure 11, the drive source 9, the brakes, and the transmission. The operators used to operate the travel structure 14 include the first, second, and third operators.

The vehicle 1 further includes circuitry 13 that controls the travel structure 14. To the circuitry 13 are connected various sensors described below. The circuitry 13 acquires detection values of the sensors. The circuitry 13 is configured as electronic circuitry that includes a processor, a volatile memory, a non-volatile memory (storage), and an I/O interface and in which the processor performs computation procedures based on programs stored in the non-volatile memory and by means of the volatile memory to accomplish various kinds of control.

Configuration of Control System

Figure 2:
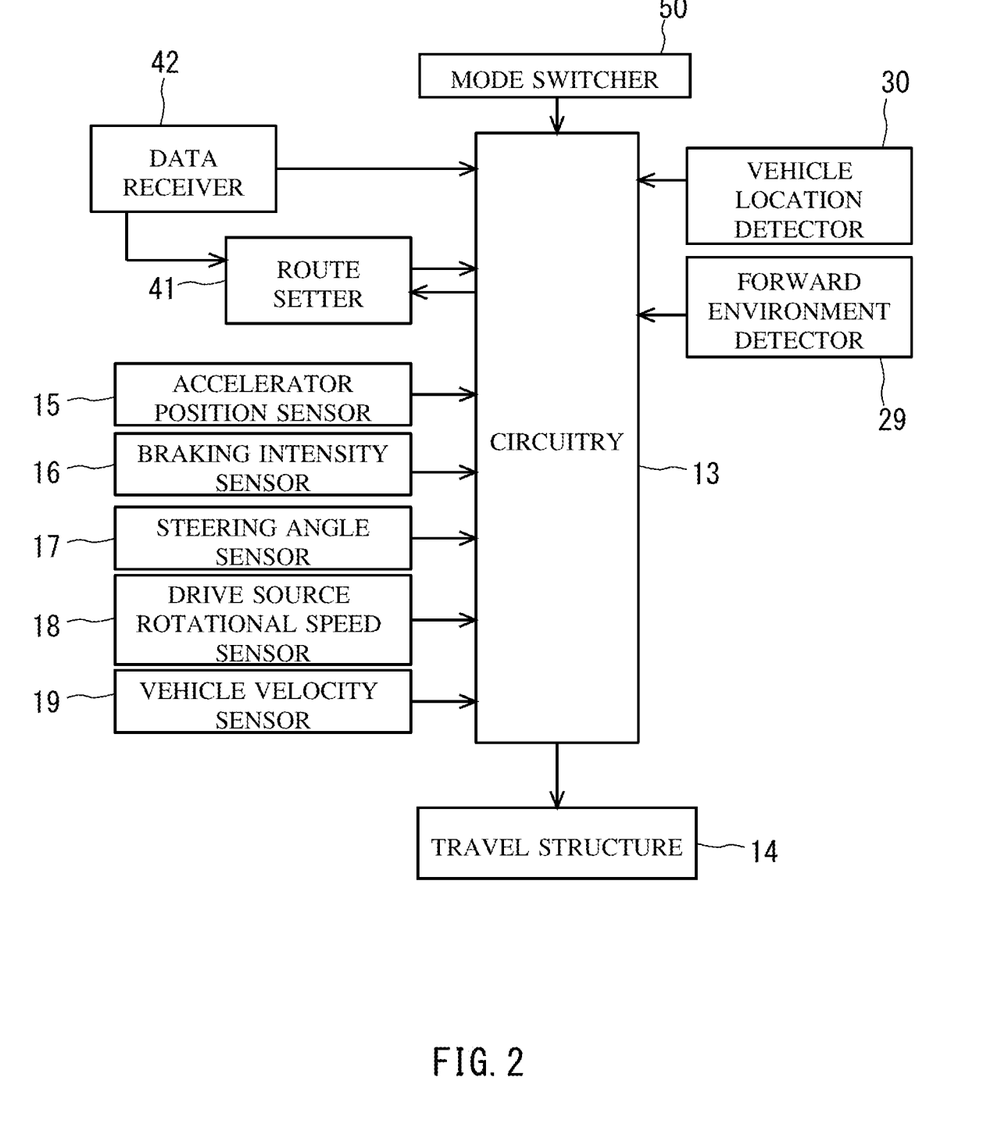
FIG. 2 is a block diagram showing a schematic configuration of a control system of the utility vehicle of FIG. 1.

FIG. 2 is a block diagram showing a schematic configuration of the control system of the utility vehicle of FIG. 1. As shown in FIG. 2, various sensors are connected to the circuitry 13. The sensors detect vehicle state parameters related to the travel system including the operators and the travel structure 14.

The sensors include, for example, an accelerator position sensor 15, a braking intensity sensor 16, a steering angle sensor 17, a drive source rotational speed sensor 18, and a vehicle velocity sensor 19. The vehicle 1 may include all or some of these sensors and may include other sensors.

The accelerator position sensor 15 detects the amount of operation of the accelerator pedal. The braking intensity sensor 16 detects the amount of operation of the brake pedal. The steering angle sensor 17 detects the direction and amount of operation of the steering wheel 12. The drive source rotational speed sensor 18 detects the rotational speed of the output shaft of the drive source 9. The vehicle velocity sensor 19 detects the velocity of the vehicle 1.

The circuitry 13 controls the travel structure 14 to effect autonomous travel without manned operation in a given travel area. A mode switcher 50 is connected to the circuitry 13. The mode switcher 50 switches the vehicle 1 between a manned operation mode in which the vehicle 1 travels in response to operations on the operators and an autonomous travel mode in which the circuitry 13 allows the vehicle 1 to autonomously travel on a given travel route without any operations on the operators.

The mode switcher 50 sends a mode switching signal to the circuitry 13 based on switching by means of a switch or a certain authentication operation. In response to the received mode switching signal, the circuitry 13 switches the control mode between the manned operation mode and the autonomous travel mode.

In the manned operation mode, the circuitry 13 controls the travel structure 14 in response to inputs provided to the operators by the driver. For example, the circuitry 13 performs output adjustment of the drive source 9 (e.g., throttle position control in the case where the drive source 9 is an engine) based on the accelerator position that the accelerator position sensor 15 detects in response to an operation performed on the accelerator pedal by the driver. For example, the circuitry 13 performs steering angle adjustment of the steering structure 11 based on the steering angle and steering direction that the steering angle sensor 17 detects in response to an operation performed on the steering wheel 12 by the driver.

In the autonomous travel mode, the circuitry 13 allows the vehicle 1 to autonomously travel on a given travel route without any operations on the operators. For example, the vehicle 1 includes a forward environment detector 29 that detects the state of an environment ahead of the vehicle 1 in the travel direction and a vehicle location detector 30 that detects the location of the vehicle 1.

The forward environment detector 29 includes, for example, at least one of a camera, radars, or a laser sensor. The circuitry 13 analyzes the forward environment based on image data of the forward environment as acquired by the camera and/or distance data as acquired by the radars or the laser sensor. The circuitry 13 controls the travel structure 14 based on the result of the analysis of the forward environment. For example, in the event that there is an obstacle ahead of the vehicle 1, the circuitry 13 controls the drive source 9 and/or brakes (not shown) to decelerate or stop the vehicle 1 or controls the steering structure 11 to change the travel direction of the vehicle 1.

The vehicle location detector 30 includes, for example, a GPS antenna. Data of a predetermined travel route is stored in the storage of the circuitry 13. In the autonomous travel mode, the circuitry 13 retrieves the data of the travel route and controls the travel structure 14 based on vehicle location information received from the vehicle location detector 30, thus allowing the vehicle 1 to travel on the travel route. Additionally, the circuitry 13 makes a minor adjustment to the travel route based on the result of the above-described analysis of the forward environment. For example, in the event that there is an obstacle ahead of the vehicle 1, the circuitry 13 performs rerouting of the travel route.

The vehicle 1 includes a route setter 41 that sets a travel route for autonomous travel. The route setter 41 may be configured as a control block of the circuitry 13 or may be embodied by a computer separate from the circuitry 13. In the case where the route setter 41 is embodied by a computer separate from the circuitry 13, the route setter 41 may be mounted in the vehicle 1 or may be embodied by a computer of a mobile terminal (such as a tablet terminal) capable of communication with the vehicle 1 via a communication network.

To the route setter 41 is connected a data receiver 42 that communicates with an external entity via a communication network and receives given data from the external entity. The data of the travel route may be set and input, for example, as follows: the user sets and inputs the travel route to a mobile terminal (such as a tablet terminal) capable of communication with the vehicle 1 via a communication network, and the information set and input by the user is sent to the circuitry 13 of the vehicle 1 via a given server. Alternatively, an operation terminal connectable to the circuitry 13 to allow the user to set and input the travel route may be mounted on the vehicle 1.

In the configuration described above, the mode switcher 50 switches the vehicle 1 between the manned operation mode in which the vehicle 1 travels in response to operations on the operators and the autonomous travel mode in which the vehicle 1 autonomously travels on a given travel route without any operations on the operators. Thus, in the case of a routine work, carrying out the autonomous travel mode can eliminate the need for manned operation and reduce the workload. In the case of a temporary work, the manned operation mode can be carried out as necessary to use the utility vehicle 1 as a human-operated vehicle. As such, with the configuration described above, the utility vehicle 1 capable of autonomous travel on a given travel route can be utilized in a flexible way.

In the present embodiment, the vehicle 1 permits the presence of an occupant in the cabin C when the vehicle 1 is in the autonomous travel mode That is, the vehicle 1 can travel in the autonomous travel mode regardless of whether any person is on board the vehicle 1.

Details of Autonomous Travel Mode

Hereinafter, the autonomous travel mode will be described in more detail. For example, the vehicle 1 is started up once the user performs a given start-up operation. Once the user performs an operation for switching to the autonomous travel mode, the mode switcher 50 sends to the circuitry 13 a mode switching signal for switching to the autonomous travel mode. After that, the circuitry 13 allows the route setter 41 to execute a process for travel route setting (travel route setting program).

In the case where a travel route is prestored in the storage, the travel route setting may be accomplished by retrieving the prestored travel route. In the case where any travel route is not prestored in the storage or where the vehicle 1 should travel on a travel route different from that used in the previous travel, the travel route setting may be performed anew. In this case, for example, the route setting may be performed using a mobile terminal communicatively connectable to the vehicle 1 by wire or wirelessly.

For example, a map is displayed on the mobile terminal, and pass points, a destination, etc. are set and input on the map. The route setter 41 executes the travel route setting program and sets a travel route based on pieces of information such as information of the input pass points, destination, etc., information of the vehicle location, and terrain information prestored in association with the map. For example, in the case where the vehicle 1 is used for patrolling a given area as described below, the patrol area may be set and input on the map, and the route setter 41 may set a travel route such that the vehicle 1 travels all over the patrol area. After the travel route setting, the circuitry 13 starts autonomous travel.

Example 1 of Route Setting for Patrol

Figure 3:
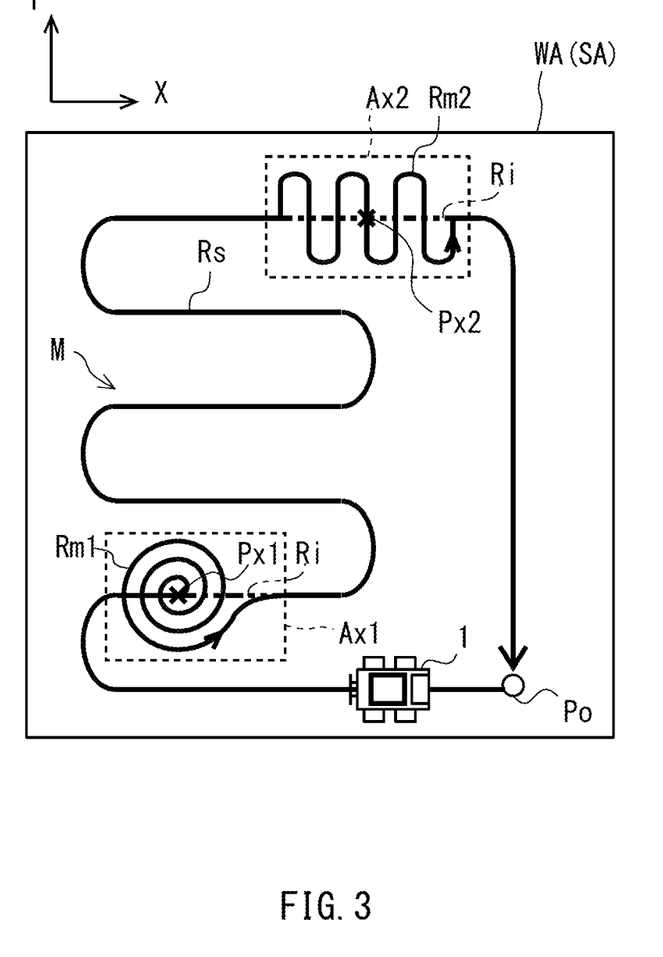
FIG. 3 is a plan view showing an example of route setting in a travel area of the utility vehicle of the exemplary embodiment.

The following describes an example where the vehicle 1 is allowed to travel in the autonomous travel mode to patrol a given area. FIG. 3 is a plan view showing an example of route setting in a travel area of the utility vehicle of the present embodiment. In the example of FIG. 3, the vehicle 1 is used for monitoring (patrolling) a patrol area WA (e.g., premises of owned property). In the example of FIG. 3, the patrol area WA is predetermined as a travel area SA of the vehicle 1.

In the example of FIG. 3, a patrol route that starts from a given point Po in the patrol area WA and on which the vehicle 1 travels to monitor the patrol area WA is set as a predetermined travel route for autonomous travel (initial travel route Ri). The initial travel route Ri includes, for example, a meandering section M where the vehicle 1 repeats back-and-forth movements in a first direction X in the patrol area WA with interposition of a movement in a second direction Y between the movements in the first direction X.

In case that a given monitoring target is detected in the travel area SA during autonomous travel in the autonomous travel mode, the vehicle 1 performs a given alert action against the monitoring target. To this end, the forward environment detector 29 functions as a target detector that detects the monitoring target in the travel area SA.

In this example, the monitoring target is an intruder into the patrol area WA, such as a person, a vehicle, or an animal. The forward environment detector 29 determines the presence or absence of the given monitoring target by analyzing an image of the environment ahead of the vehicle 1. Upon detecting the presence of the monitoring target, the forward environment detector 29 sends a detection signal to the circuitry 13. Upon receiving the detection signal from the forward environment detector 29, the circuitry 13 controls the vehicle 1 to perform the given alert action. The alert action includes a notifying action, a data collecting action, and a threatening action.

The notifying action is to notify a computer device external to the vehicle 1 and capable of communication with the vehicle 1 via a communication network that the monitoring target has been detected. The computer device external to the vehicle 1 may be a mobile terminal carried by a user or a management device operated by an administrator. The data collecting action is to collect various kinds of data at the time of detection of the monitoring target. The data may include, for example, the location of detection (the vehicle location at the time of detection), the day and time of detection, the characteristics (such as type, size, and moving speed) of the monitoring target, the surroundings (such as atmospheric temperature and weather) at the time of detection, and a captured image of the monitoring target. The circuitry 13 may send the collected data to the computer device external to the vehicle 1.

The threatening action is to threaten the monitoring target by emitting light or sound from the vehicle 1. In the case where the vehicle 1 includes a headlamp, the circuitry 13 may cause the headlamp to light up or blink to threaten the monitoring target. In the case where the vehicle 1 includes a horn (warning alarm), the circuitry 13 may cause the horn to beep to threaten the monitoring target. The vehicle 1 may include a light-emitting source or loudspeaker for the threatening action.

Additionally, in case that the given monitoring target is detected in the travel area SA during autonomous travel in the autonomous travel mode, the circuitry 13 stores the location of the monitoring target (location of finding). Every time the monitoring target is found, the location Px of the monitoring target is stored as history information in a storage mounted in the vehicle 1 or a storage device (such as a server or mobile terminal) external to the vehicle 1 and capable of communication with the vehicle 1 via a communication network.

In travel route setting, the route setter 41 sets reference points Px (Px1, Px2, . . . ) at the locations where the monitoring target was detected and sets a travel route Rs based on the reference points Px. In the example of FIG. 3, the route setter 41 sets the travel route Rs by modifying the predetermined initial travel route Ri such that the vehicle 1 performs given alert travel in partial regions Ax (Ax1, Ax2, . . . ) that are set based on the reference points Px.

More specifically, the route setter 41 sets each alert travel region Ax with respect to a corresponding one of the reference points Px. For example, the alert travel region Ax is set as a region having a given shape (rectangular shape in the example of FIG. 3) centered at the reference point Px. Alternatively, the alert travel region Ax may be set as a region having a given shape with the reference point Px on its boundary (e.g., at the center of a side or a vertex) and extending ahead of the reference point Px in the travel direction of the vehicle 1.

In the alert travel regions Ax, the route setter 41 sets alert travel routes Rm (Rm1, Rm2, . . . ) on which patrol is performed more carefully than on the initial travel route Ri. Each of the alert travel routes Rm is set such that the travel distance or travel time in a corresponding one of the alert travel regions Ax is longer on the alert travel route Rm than on the initial travel route Ri. Additionally or alternatively, the alert travel route Rm may occupy a larger travel area (alert zone) in the alert travel region Ax than the initial travel route Ri.

For example, the alert travel route Rm1 in the alert travel region Ax1 is set as a travel route on which the vehicle 1 travels (makes circles) in a helical pattern (or spiral pattern) starting from the reference point Px1. For example, the alert travel route Rm2 in the alert travel region Ax2 is set as a travel route meandering laterally with respect to the initial travel route Ri. Furthermore, the alert travel route Rm2 is set so as to pass through the reference point Px2.

The alert travel route Rm may be set as a travel route that does not pass through the reference point Px. In the example of FIG. 3, the alert travel route Rm1 and the alert travel route Rm2 are set in different patterns. However, all of the alert travel routes Rm may be set in the same pattern. The setting pattern of the alert travel routes Rm may be varied depending on given factors such as the type of the monitoring target, the time of day of finding of the monitoring target, and the newness of the history information of the location of finding.

For example, in the case where there are a plurality of reference points Px, the route setter 41 may assign an importance level for travel route setting to each of the reference points Px such that the newer the reference point Px is (namely, the newer the history information about finding of the monitoring target at the reference point Px is), the higher the importance level is. In this case, the route setter 41 may set the travel route (alert travel route Rm) around each of the reference points Px in a different pattern depending on the assigned importance level. That is, each of the alert travel routes Rm (Rm1, Rm2, . . . ) may be set in the alert travel region Ax such that the later the monitoring target was found at the location (reference point Px) corresponding to the alert travel region Ax, the greater is the extent to which the patrol on the alert travel route Rm is performed more carefully (over a longer distance, longer time, or wider range) than that on the initial travel route Ri.

Additionally or alternatively, in the case where there are a plurality of reference points Px, the route setter 41 may assign an importance level for travel route setting to a partial region (alert travel region Ax) such that the greater the number of the reference points Px in the partial region is, the higher the importance level is. In this case, the route setter 41 may set the travel route (alert travel route Rm) around each of the reference points Px in a different pattern depending on the importance level. That is, each of the alert travel routes Rm (Rm1, Rm2, . . .) may be set in the alert travel region Ax such that the more often the monitoring target has been found at the location (reference point Px) corresponding to the alert travel region Ax, the greater is the extent to which the patrol on the alert travel route Rm is performed more carefully (over a longer distance, longer time, or wider range) than that on the initial travel route Ri.

The route setter 41 sets the travel route Rs by connecting the segments of the initial travel route Ri that are outside the alert travel regions Ax to the alert travel routes Rm set in the alert travel regions Ax. The travel route Rs currently set is stored in a storage mounted in the vehicle 1 or a storage device (such as a server or mobile terminal) external to the vehicle 1 and capable of communication with the vehicle 1 via a communication network. The data of the currently set travel route Rs may be stored by overwriting data of a past travel route Rs or may be stored separately from the data of the past travel route Rs. That is, history data of past travel routes Rs may be stored in the storage or the like.

In the configuration described above, the travel route Rs of the utility vehicle 1 is set based on history information of the locations where the monitoring target was detected during autonomous travel of the utility vehicle 1. This makes it possible to set the travel route Rs such that the locations where the monitoring target was detected will be monitored carefully during autonomous travel. Thus, the given travel area SA can be monitored efficiently.

Furthermore, in the above configuration, the initial travel route Ri is predetermined, and the initial travel route Ri is modified to carefully patrol a partial region that is set based on the location where the monitoring target was detected. This makes it easier to set the travel route Rs that allows for both alert travel all over the travel area SA and careful patrol around the location where the monitoring target was detected. Thus, in the case where the vehicle 1 is allowed to travel to patrol (monitor) a travel area SA such as an extensive farming land or forest in which there are no or few landmarks, the travel route Rs can be set as a route on which the monitoring target can be found efficiently.

In the case where the monitoring target has been detected at different locations, an importance level may be assigned to each of the locations as described above, and the travel route Rs may be set such that the vehicle 1 performs alert travel in a pattern appropriate for the importance level. By thus changing the carefulness of alert travel according to the details of detection of the monitoring target, the travel route Rs can be set as a route with enhanced efficiency in finding the monitoring target.

The pattern of the alert travel route Rm set in the alert travel region Ax is not limited to a helical (spiral) pattern or meandering pattern as shown in the example of FIG. 3, and the alert travel route Rm can be set in various other patterns. For example, the route setter 41 may set an alert travel route Rm so as to increase the number of times that the alert travel route Rm passes through the reference point Px. That is, an alert travel route Rm that includes a repeatedly passed location (intersection) may be set. Alternatively, for example, the route setter 41 may set an alert travel route Rm that circles around the reference point Px. The route setter 41 may set an alert travel route Rm that includes these different characteristics.

In the case where different alert travel regions Ax based on different reference points Px overlap each other, the overlapping alert travel regions Ax may be collectively set as one alert travel region (overlap region) based on the different reference points Px.

The overlap region may be set as a region that includes at least all of the different alert travel regions. For example, in the case where two alert travel regions Axa and Axb based on two reference points Pxa and Pxb overlap each other, the overlap region may be set as a region that includes at least the alert travel regions Axa and Axb.

Alternatively, the overlap region may be set as another alert travel region based on the different reference points Px. For example, in the case where two alert travel regions Axa and Axb based on two reference points Pxa and Pxb overlap each other, a midpoint of a line segment between the two reference points Pxa and Pxb may be set as a new reference point, and the overlap region may be set as a given region based on the new reference point.

Machine learning can be used to set alert travel regions Ax and alert travel routes Rm. For example, the route setter 41 acquires the area of an alert travel region Ax or the travel time in the alert travel region Ax by using a learning model to which the distance between two neighboring reference points Px is input and from which the area or travel time is output. The learning model is created using a known machine learning algorithm such as a neural network.

The teacher data to be input to the machine learning algorithm may be created, for example, as follows: alert travel is performed based on a reference point Px; data indicating a location where the monitoring target was detected again during the alert travel is used to determine the distance between the reference point Px and the location of detection; and the distance is associated with a desired value of the area of the alert travel region Ax or a desired travel time in the alert travel region Ax. For example, the alert travel region Ax may be set such that the shorter the distance between the two neighboring reference points Px is, the smaller the area of the alert travel region Ax is. The alert travel route Rm may be set such that the shorter the distance between the two neighboring reference points Px is, the longer the travel time per unit area is.

During autonomous travel on an alert travel route Rm in an alert travel region Ax, the circuitry 13 may control the travel structure 14 in a different way than on a travel route outside the alert travel region Ax. For example, the circuitry 13 may control the travel structure 14 such that the upper velocity limit of the vehicle 1 is lower on the alert travel route Rm than in a region other than the alert travel region Ax. The circuitry 13 may control the travel structure 14 to stop the vehicle 1 once per given travel distance on the alert travel route Rm. These kinds of travel control can lead to a longer travel time in the alert travel region Ax.

Example 2 of Route Setting for Patrol

Figure 4:
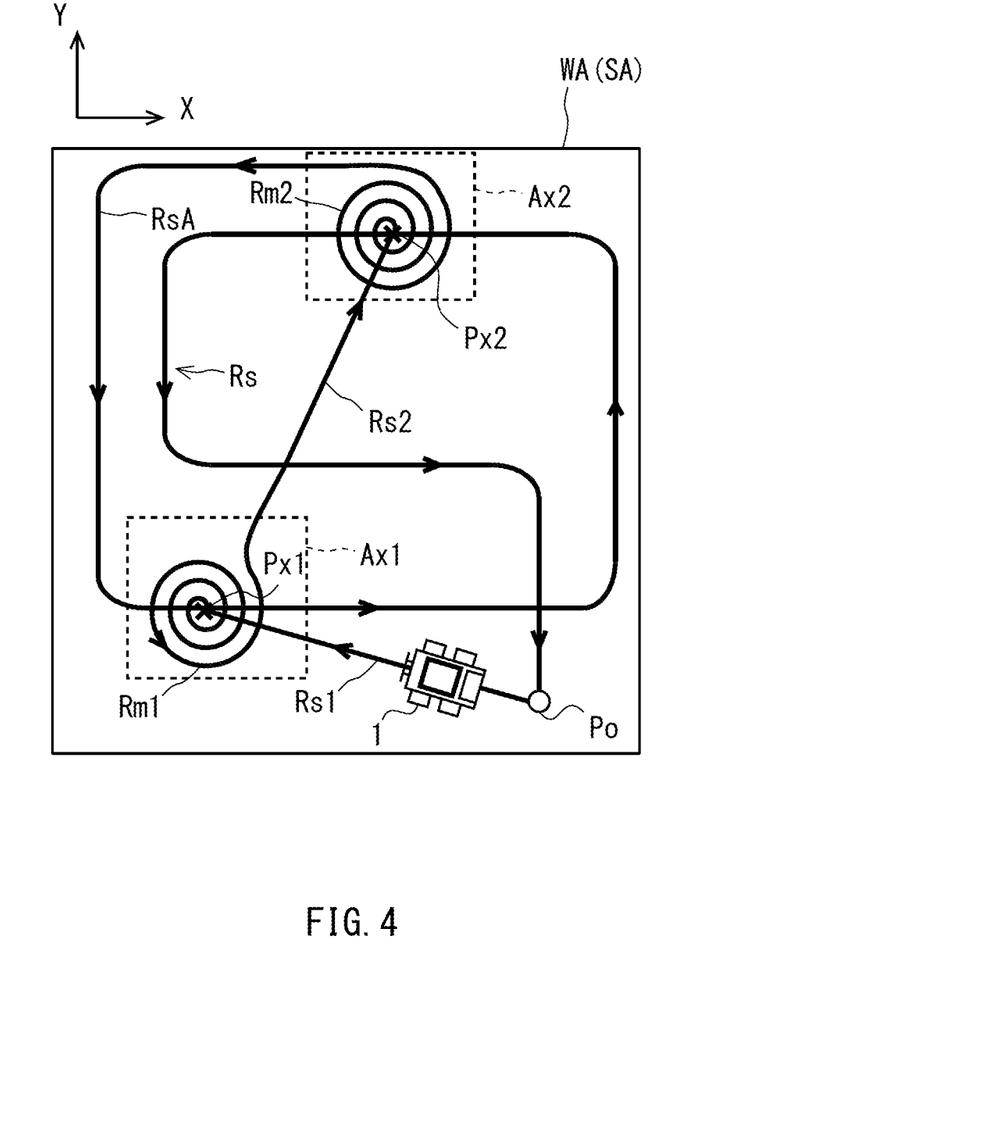
FIG. 4 is a plan view showing another example of route setting in a travel area of the utility vehicle of the exemplary embodiment.

The route setter 41 may set a travel route Rs without any initial travel route Ri. FIG. 4 is a plan view showing another example of route setting in a travel area of the utility vehicle of the present embodiment. In the example of FIG. 4, as in the example of FIG. 3, the vehicle 1 is used for monitoring (patrolling) a patrol area WA (e.g., premises of owned property). The patrol area WA is predetermined as the travel area SA of the vehicle 1 also in the example of FIG. 4. In the following description, the elements identical to those in the example of FIG. 3 are denoted by the same reference signs and will not be described repeatedly.

The route setter 41 sets the travel route Rs such that the vehicle 1 passes through the reference point Px and travels according to a given logic in the travel area SA. In the example of FIG. 4, the route setter 41 sets the travel route Rs according to a predetermined rule.

The following describes an example of the rule for setting the travel route Rs. First, the route setter 41 sets a travel route segment Rs1 on which the vehicle 1 travels straight from a starting point Po toward the nearest reference point Px1. The route setter 41 sets an alert travel region Ax1 based on the reference point Px1 and sets an alert travel route Rm1 in the alert travel region Ax1. The alert travel route Rm1 is set in the same pattern as in the example of FIG. 3.

In the case where there are a plurality of reference points Px, the route setter 41 sets a travel route segment Rs2 on which the vehicle 1 travels straight from the first reference point Px1 toward the nearest reference point Px2. The route setter 41 sets an alert travel region Ax2 based on the reference point Px2 and sets an alert travel route Rm2 in the alert travel region Ax2. In the case where there are third and subsequent reference points Px, travel route setting is performed for the third and subsequent reference points Px in the same manner as for the second reference point Px2.

After having set alert travel routes Rm for all of the reference points Px, the route setter 41 sets a travel route segment RsA on which the vehicle 1 makes a circuit of the entire travel area SA and finally returns to the starting point Po. The travel route segment RsA may be set such that the vehicle 1 passes through all of the reference points Px again. The pattern of the circuit travel may be a helical (spiral) pattern as in the example of FIG. 4, may be another regular pattern such as a meandering or zigzag pattern, or may be a random pattern that is set using given random numbers (or pseudorandom numbers). The travel route segment RsA for circuit travel is set such that the vehicle 1 does not reach the boundary (outer edges) of the travel area SA or a no-entry region predefined in the travel area SA.

The route setter 41 connects the travel route segments Rs1, Rm1, Rs2, Rm2, and RsA in series to set the travel route Rs in the travel area SA. In the case where there is no reference point Px (when the travel route Rs is set in the travel area SA for the first time), the route setter 41 sets the travel route Rs in the same manner as the route setter 41 sets the travel route segment RsA. Alternatively, a predetermined initial travel route Ri (FIG. 3) may be set as the travel route Rs until any reference point Px is set.

The rule for setting the travel route Rs is not limited to the above example, and various rules may be employed. For example, a travel route segment may be set such that the vehicle 1 travels through a plurality of reference points Px in ascending order of distance from the starting point Po.

Alternatively, a travel route segment may be set such that the vehicle 1 travels through a plurality of reference points Px in descending order of the date and time of detection. The travel route segment RsA for circuit travel may be set such that given characteristics of the travel route segment RsA (such as the number of curves and the length of a straight segment between curved segments) vary depending on the number of the reference points Px (or the number of the alert travel regions Ax).

For example, in the case where the number of the reference points Px is greater than a first threshold, the number of curves on the travel route segment RsA may be set smaller, and/or the length of a straight segment on the travel route segment RsA may be set longer, than in the case where the number of the reference points Px is equal to or smaller than the first threshold. Additionally or alternatively, in the case where the number of the reference points Px is greater than a second threshold that is greater than the first threshold, the travel route segment RsA may be set such that the vehicle 1 returns straight to the starting point Po (may be set in the same manner as a travel route segment RsB described later with reference to FIG. 6).

The travel area SA may be divided into separate regions, and a travel route segment may be set such that the vehicle 1 travels through each of the regions in descending order of the number of the reference points Px contained in the region. There need not be any alert travel route Rm. A travel route segment between neighboring (consecutive) reference points Px on a travel route may be set not as a straight segment but as a segment with a given regular pattern (such as a meandering or zigzag pattern) or a random pattern.

In setting of a new travel route Rs, travel routes Rs set in the past may be used as a reference. For example, the new travel route Rs may be set close to one of the past travel routes Rs in which the number of times of detection of the monitoring target is greater than in the other past travel routes Rs. Alternatively, the new travel route Rs may be set so as not to overlap the immediately previous travel route Rs.

The route setter 41 may randomly set a travel route Rs that passes through a reference point Px. That is, setting a travel route Rs based on a given logic includes setting the travel route Rs randomly. For example, the route setter 41 acquires a random number per unit distance and determines a travel pattern (such as straight movement, right turn, or left turn) according to the acquired random number.

Setting a travel route Rs without any initial travel route Ri as described above can eliminate the need to set any initial travel route Ri and reduce the burden on the user.

The route setter 41 may use terrain data or map data as a reference when setting a travel route Rs. The terrain data or map data is prestored in a storage mounted in the vehicle 1 or a storage device (such as a server or mobile terminal) external to the vehicle 1 and capable of communication with the vehicle 1 via a communication network.

For example, a region that is determined from the terrain data or map data to be non-travelable by the vehicle 1 (e.g., a rocky place that the vehicle 1 cannot enter, a building, or a wall) may be excluded beforehand from the area where the travel route Rs is to be set (excluded from the travel area SA). For example, the route setter 41 may set the travel route Rs such that the vehicle 1 preferentially travels in a region that is determined from the terrain data or map data to be shadowed by a rocky place or a building (a region with poor visibility).

For example, the route setter 41 may, based on the terrain data or map data, set the travel route Rs such that the vehicle 1 preferentially travels around a spot such as an entrance of a building that the user wants to monitor carefully. The spot that the user wants to monitor carefully may be input by the user. For example, a map based on the map data may be displayed on the user's mobile terminal capable of communication with the vehicle 1, the user may touch a spot on the displayed map, and the touched spot may be set as the spot to be monitored carefully.

The route setter 41 may set the travel route Rs based on road condition data indicating the road condition in the travel area SA. In the road condition data, the travel area SA is divided into regions with different predetermined road condition levels. The road condition data is stored in a storage mounted in the vehicle 1 or stored in a storage device (such as a server or mobile terminal) external to the vehicle 1 and capable of communication with the vehicle 1 via a communication network.

For example, in the case where priority is given to the travel distance in setting the travel route Rs for movement of the vehicle 1 to a reference point Px, the route setter 41 permits choosing a route where the road condition level is equal to or higher than a somewhat high level. For example, in the case where priority is given to the required time in setting the travel route Rs for movement of the vehicle 1 to a reference point Px, the route setter 41 chooses a travel route that requires the shortest time while taking into account velocity limits associated with the road condition levels.

For example, in the case where priority is given to reduced variations in the orientation of the vehicle 1 in setting the travel route Rs for movement of the vehicle 1 to a reference point Px, the route setter 41 chooses a travel route with the smallest value of the distance over which the road condition level is equal to or higher than a given level for which travel is permitted. In this case, the travel route set by the route setter 41 may be one with the lowest occurrence of a state where the road condition level differs between the road with which the left wheels 2 and 3 are in contact and the road with which the right wheels 2 and 3 are in contact.

During autonomous travel in the autonomous travel mode, the circuitry 13 may control the travel structure 14 according to the road condition of a region ahead of the vehicle location in the travel direction.

In setting the travel route Rs, the route setter 41 may use given data related to the surroundings of the vehicle 1 as a reference. The data related to the surroundings of the vehicle 1 may include, for example, weather, atmospheric temperature, atmospheric pressure, season, date and time, geographical zone (climate zone), and ground type (such as muddy area, marshy area, sand beach, or desert). One of these kinds of data may be used, or two or more thereof may be used in combination. The data related to the surroundings (such as weather, season, date and time, and geographical zone) is accumulated, for example, in a server communicatively connected to the data receiver 42 of the vehicle 1 via a communication network, and is sent to the data receiver 42 from the server. Alternatively, the data related to the surroundings (such as atmospheric temperature, atmospheric pressure, and road state) may be, for example, values detected by sensors mounted on the vehicle 1.

For example, when setting an alert travel route Rm in an alert travel region Ax, the route setter 41 may set the alert travel route Rm as a simplified or complicated route according to the weather or atmospheric pressure.

During autonomous travel of the vehicle 1, the route setter 41 may modify the current travel route Rs (rerouting) in response to a change in the surroundings. For example, upon determination that the weather has changed (or that the atmospheric pressure has fallen within a given range), the route setter 41 may modify an alert travel route Rm in an alert travel region Ax into a simplified or complicated route. For example, upon determination that the weather has changed (or that the atmospheric pressure has fallen within a given range), the route setter 41 may modify the travel route Rs such that the vehicle 1 returns from the current location to the starting point Po.

The route setter 41 may set the travel route Rs based on a result of a travel simulation of a virtual vehicle modeled on the vehicle 1. The travel simulation may be performed by the route setter 41 or by a computer external to the vehicle 1 and capable of communication with the vehicle 1 via a communication network. An independent computer that does not communicate with the vehicle 1 may perform the travel simulation, and travel route group data obtained as a result of the simulation may be transferred to a storage such as that of the vehicle 1 through means such as a recoding medium.

For the travel simulation, terrain data of the travel area SA is prepared. The terrain data is created, for example, from a satellite image. The computer that performs the travel simulation creates a virtual travel space based on road geometry data of the travel area SA. The computer further creates a virtual vehicle modeled on the vehicle 1 and places the virtual vehicle in the virtual travel space.

The computer performs the travel simulation in which the virtual vehicle is allowed to travel in the created virtual travel space, thereby extracting a group of routes. In such a travel simulation, machine learning can be used. The route setter 41 may select the best route from the extracted group of routes or combine different routes included in the group of routes and set the resulting combination as the travel route Rs.

Patrol Using Unmanned Air Vehicle

The above-described setting of the travel route Rs of the vehicle 1 for patrol can be performed using a result of patrol flight of an unmanned air vehicle (UAV, also referred to as "drone").

Figure 5:
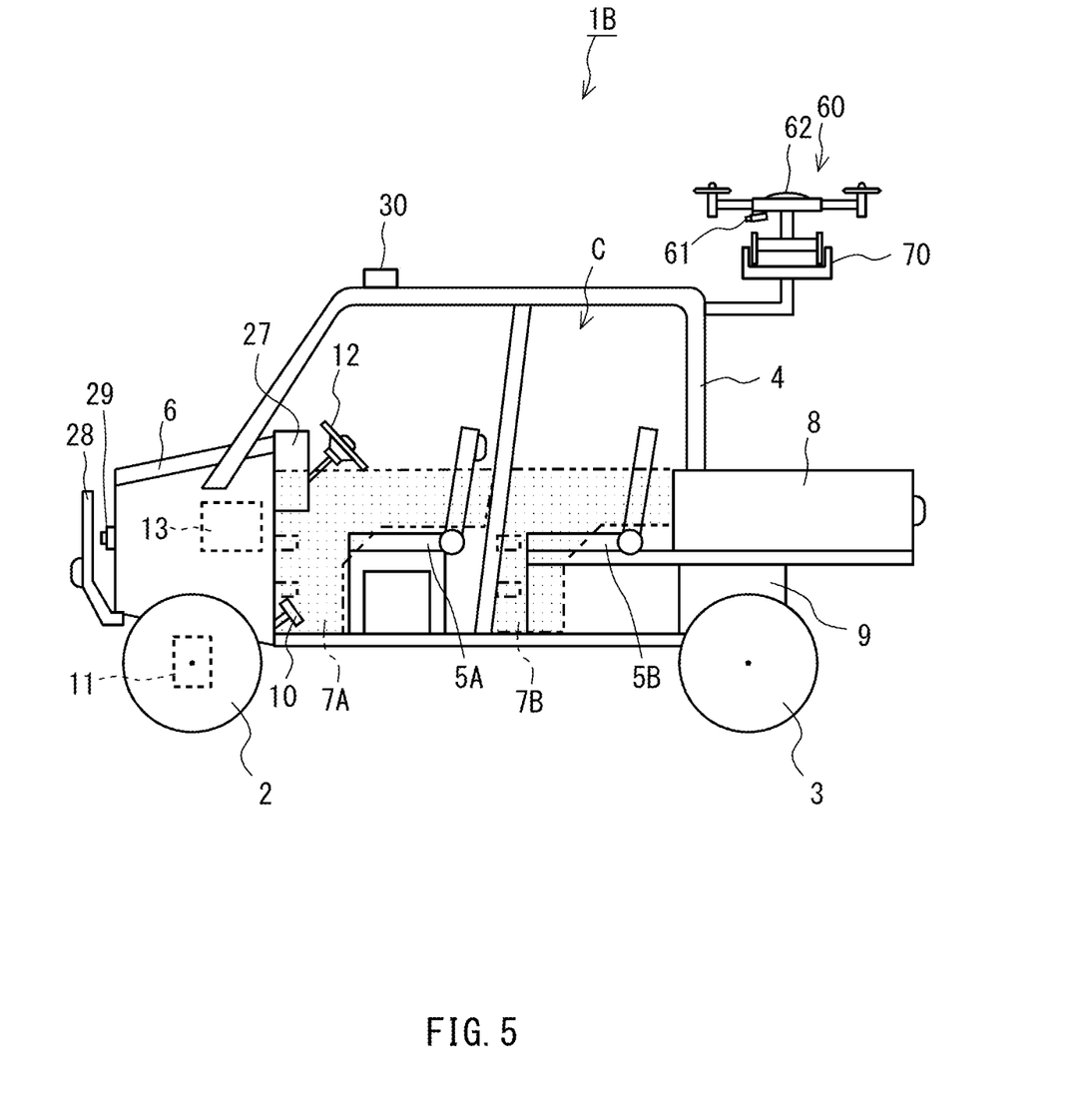
FIG. 5 is a schematic left side view showing a utility vehicle of a variant of the exemplary embodiment.
Figure 6:
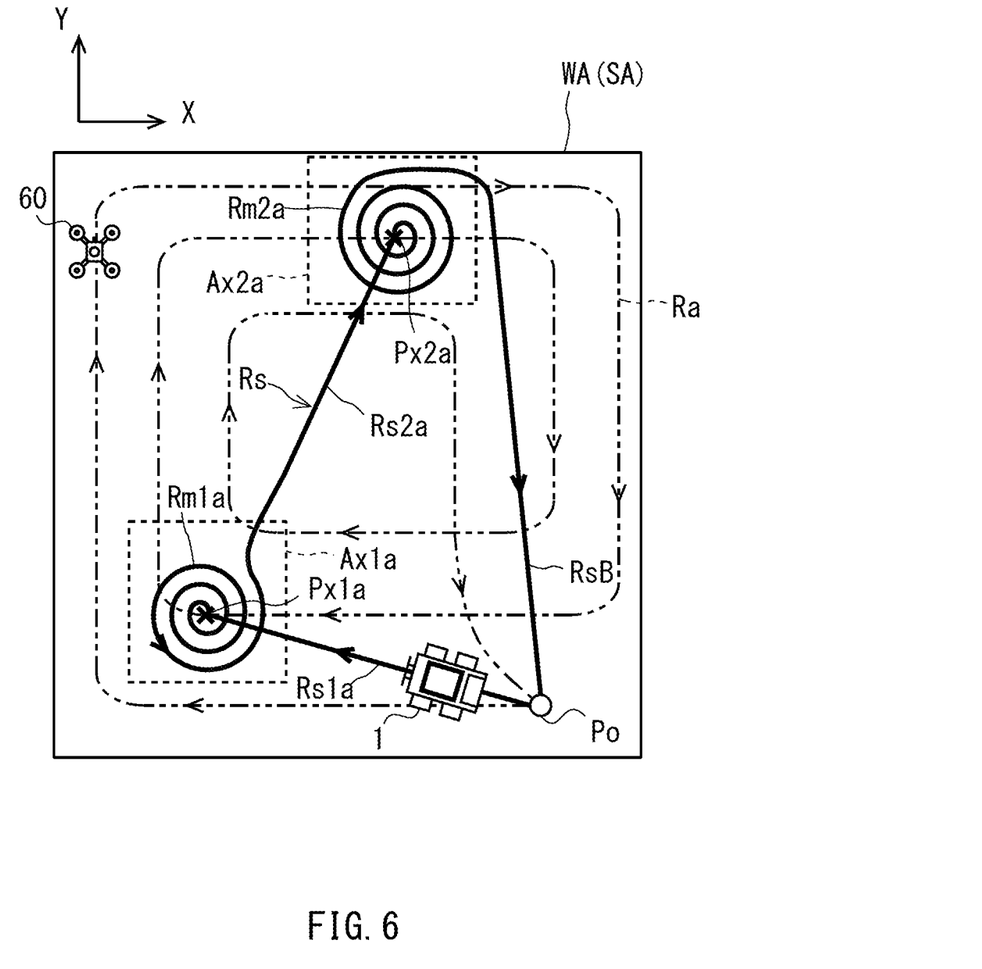
FIG. 6 is a plan view showing an example of route setting in a travel area of the utility vehicle of the variant.

FIG. 5 is a schematic left side view showing a utility vehicle of a variant of the above embodiment. FIG. 6 is a plan view showing an example of route setting in a travel area of the utility vehicle of this variant. The components of the utility vehicle 1B (simply referred to as "vehicle 1B" hereinafter) of FIG. 5 that are identical to those of the vehicle 1 of FIG. 1 are denoted by the same reference signs and will not be described repeatedly.

The vehicle 1B of FIG. 5 differs from the vehicle 1 of FIG. 1 in that the vehicle 1B includes an air vehicle takeoff/landing platform 70 from which an unmanned air vehicle 60 takes off and on which the unmanned air vehicle 60 lands. In the example of FIG. 5, the air vehicle takeoff/landing platform 70 is located behind the cabin C (above the cargo bed 8) and connected to the vehicle body frame 4.

The unmanned air vehicle 60 includes an environment detector 61 that detects the state of an environment located in a given direction (obliquely below) with respect to the unmanned air vehicle 60. The environment detector 61 includes, for example, at least one of a camera, radars, or a laser sensor. The unmanned air vehicle 60 analyzes the environment located in the given direction with respect to the unmanned air vehicle 60 based on image data of the environment as acquired by the camera and/or distance data as acquired by the radars or the laser sensor.

The unmanned air vehicle 60 further includes a location detector 62 that detects the current location of the unmanned air vehicle 60, and is capable of autonomous flight. Like the vehicle location detector 30, the location detector 62 includes, for example, a GPS antenna. The unmanned air vehicle 60 performs flight control based on the environment data obtained from the environment detector 61 and the unmanned air vehicle 60's current location obtained from the location detector 62.

The unmanned air vehicle 60 autonomously flies over and patrols the travel area SA of the vehicle 1 to monitor the travel area SA by the environment detector 61. Upon detecting a monitoring target during the autonomous flight, the unmanned air vehicle 60 sends detection data to the vehicle 1. The data receiver 42 of the vehicle 1 receives the detection data from the unmanned air vehicle 60. The detection data includes the location of the monitoring target, the time of day of detection, and the type of the detected target.

The route setter 41 takes locations where the monitoring target was detected by the unmanned air vehicle 60 into account as reference points Px and sets a travel route Rs such that the vehicle 1 preferentially travels around the locations (reference points Px1a and Px2a) where the monitoring target was detected by the unmanned air vehicle 60.

A specific example will be described hereinafter. Before the start of patrol, the vehicle 1 is at rest at the starting point Po. The unmanned air vehicle 60 rests on the air vehicle takeoff/landing platform 70. The air vehicle takeoff/landing platform 70 may be capable of charging the unmanned air vehicle 60 while the unmanned air vehicle 60 rests on the air vehicle takeoff/landing platform 70.

At the start of patrol, first, the unmanned air vehicle 60 is allowed to autonomously fly on a predetermined flight route Ra over the travel area SA of the vehicle 1 and monitor the travel area SA. For example, the flight route Ra is set as a route on which the unmanned air vehicle 60 flies over the travel area SA in a spiral pattern and then returns to the starting point Po. The flight route Ra may be set based on reference points Px just as does the travel route Rs of the vehicle 1. As previously stated, the unmanned air vehicle 60 sends detection data to the vehicle 1 upon detecting a monitoring target during the autonomous flight. The accuracy of detection of the monitoring target by the environment detector 61 of the unmanned air vehicle 60 may be lower than the accuracy of detection by the forward environment detector 29 of the vehicle 1.

The route setter 41 acquires the detection data from the unmanned air vehicle 60 via the data receiver 42, and records the locations where the monitoring target was detected by the unmanned air vehicle 60 as reference points Px. The point in time when the data receiver 42 of the vehicle 1 receives the detection data from the unmanned air vehicle 60 may be during flight of the unmanned air vehicle 60 or after the unmanned air vehicle 60 completes autonomous flight and arrives at the air vehicle takeoff/landing platform 70 of the vehicle 1 located at the starting point Po. In the case of sending the detection data during flight, the unmanned air vehicle 60 may send the detection data every time the unmanned air vehicle 60 detects the monitoring target. Alternatively, the unmanned air vehicle 60 may send the detection data at given time intervals after the start of autonomous flight of the unmanned air vehicle 60, and in this case the sent data may be a collection of data obtained during each interval.

After return of the unmanned air vehicle 60 to the vehicle 1, the route setter 41 sets the travel route Rs of the vehicle 1 based on the detection data. For example, the route setter 41 sets travel route segments Rs1a and Rs2a starting from the starting point Po and connecting in series all of the reference points Px (two reference points Px1a and Px2a in the example of FIG. 6) defined based the locations where the monitoring target was detected by the unmanned air vehicle 60, and sets a travel route segment RsB on which the vehicle 1 having passed through all of the reference points Px returns to the starting point Po.

Furthermore, the route setter 41 sets alert travel regions Ax1a and Ax2a that are based on the reference points Px1a and Px2a, respectively, and sets alert travel routes Rm1a and Rm2a in the alert travel regions Ax1a and Ax2a, respectively. The alert travel routes Rm1a and Rm2a are set in the same patterns as the alert travel routes Rm1 and Rm2 in the example of FIG. 3 or FIG. 4. The route setter 41 connects the travel route segments Rs1a, Rm1a, Rs2a, Rm2a, and RsB in series to set the travel route Rs in the travel area SA.

In the example of FIG. 6, the travel route segment RsA for circuit travel is not set unlike in the example of FIG. 4. Thus, the total length of the route segments other than the alert travel routes Rm in the travel route Rs of the vehicle 1 can be shorter in the example of FIG. 6 (Rs1a+Rs2a+RsB) than in the example of FIG. 4 (Rs1+Rs2+RsA).

Allowing the unmanned air vehicle 60 to fly beforehand over the travel area SA as described above makes it possible for the vehicle 1 to preferentially travel in regions of the travel area SA where the monitoring target is highly likely to be detected. Consequently, the monitoring target can be found effectively within a short travel time.

In case that the unmanned air vehicle 60 does not detect the monitoring target during flight, the route setter 41 may set the travel route Rs of the vehicle 1 in a manner as described in the example of FIG. 3 or FIG. 4.

The route setter 41 may set the travel route Rs by combining the example of FIG. 6 with the example of FIG. 3 and/or the example of FIG. 4. For example, first, a travel route Rs for a first round of patrol may be set based on detection data obtained by the unmanned air vehicle 60 as in the example of FIG. 6, and then travel routes Rs for second and subsequent rounds of patrol may be set based on history information of past detection results as in the example of FIG. 3 or FIG. 4.

In this case, the travel routes may be set such that the vehicle 1 passes through the starting point Po between the first and second rounds, or a route segment for return to the starting point Po in the first round (the travel route segment RsB in FIG. 6) and a travel route segment in the second round (e.g., the travel route segment Rs1 in FIG. 4) may be combined into a single route not including the starting point Po. For example, the end point of the alert travel route Rm based on the last reference point Px in the first round may be connected straight to the start point of the alert travel route Rm based on the first reference point Px in the second round.

The reference points Px (Px1a and Px2a) that were set through detection of the monitoring target by the unmanned air vehicle 60 can, in the next and subsequent setting of the travel route Rs, be handled in the same manner as reference points Px set through detection of the monitoring target by the vehicle 1.

Although in the above example the unmanned air vehicle 60 is allowed to autonomously fly, the unmanned air vehicle 60 may be allowed to fly by manned operation. The detection of the monitoring target may be performed by the environment detector 61 as in the above example. Alternatively, the user may make a given operation input at a desired time based on information such as an image captured by the environment detector 61, and the location of the unmanned air vehicle 60 at the time when the operation input was made may be acquired as the location of detection of the monitoring target (detection data).

Although in the above example the vehicle 1 does not start autonomous travel until the unmanned air vehicle 60 returns to the vehicle 1, the present disclosure is not limited to this operation of the vehicle 1. For example, the vehicle 1 may be moved toward the unmanned air vehicle 60 once the unmanned air vehicle 60 finds the monitoring target. The unmanned air vehicle 60 may circle around the location of detection of the monitoring target, move to follow the monitoring target, or move toward the vehicle 1. After return of the unmanned air vehicle 60 to the vehicle 1, the route setter 41 may set a travel route Rs starting from the point at which the unmanned air vehicle 60 has returned. The route setter 41 may predict or predetermine the location of return of the unmanned air vehicle 60 (location where the vehicle 1 and the unmanned air vehicle 60 will meet) and may set a travel route Rs starting from the predicted or predetermined location.

The unmanned air vehicle 60 may have functions other than flight for monitoring purpose. For example, the unmanned air vehicle 60 may include a working unit for sowing of seeds or spraying of agrochemicals. The unmanned air vehicle 60 may be able to detect the monitoring target during working flight using the working unit. In the case where the unmanned air vehicle 60 includes the working unit, the vehicle 1 may include a replenishment unit for replenishing the unmanned air vehicle 60 with the seeds or agrochemicals. Like the vehicle 1, the unmanned air vehicle 60 may perform a given alert action (such as a notifying action, data collecting action, or threatening action).

Other Embodiments

Although the foregoing has described an exemplary embodiment of the present disclosure, the present disclosure is not limited to the above embodiment, and various modifications, changes, and adaptations can be made without departing from the gist of the present disclosure.

For example, although in the above embodiment the same circuitry 13 performs both control in the manned operation mode and control in the autonomous travel mode, the present disclosure is not limited to this configuration. For example, the vehicle 1 may include first circuitry (first ECU) that controls the vehicle 1 in the manned operation mode and second circuitry (second ECU) that controls the vehicle 1 in the autonomous travel mode.

Although in the above embodiment the vehicle 1 is capable of travel by manned operation, the control in the autonomous travel mode of the above embodiment may be applied to a vehicle 1 specialized for autonomous travel. For example, a vehicle 1 that autonomously travels on a travel route Rs set as described in the above embodiment may be used for purposes such as monitoring or rescue activity in a place (a dangerous zone or disaster-affected site) that any person cannot enter.

The data of the reference points Px or the data of the set travel routes Rs in the above embodiment may be shared among different vehicles 1. In the case where the travel ability differs according to the type of vehicle, the data of the travel routes Rs may include label data associated with the type of vehicle.

In the case where there is an object which should be exempted from being detected as the monitoring target (examples of the object include a worker or domestic animal located in the travel area SA), a given identifier is provided to the object to be exempted. Examples of the identifier include an armband, a near-field wireless communication tag, and an identification code. In case that the forward environment detector 29 recognizes, based on information such as a captured image, the presence of an object to be detected as the monitoring target, but further detects the identifier, the forward environment detector 29 may determine that the monitoring target has not been detected. This can prevent erroneous detection of the monitoring target.

Although in the above embodiment the monitoring target is an intruder (a moving object such as a person or an animal), the monitoring target is not limited to such an intruder. For example, the monitoring target may be a plant, a fruit, a mushroom, an insect, a small animal, or an obstacle (such as a rock, a fallen rock, or a fallen tree). Upon detecting such a monitoring target, the vehicle 1 may perform a given alert action such as a picking action, an exterminating action, or a removing action in addition to or instead of the previously described alert actions such as the notifying action and data collecting action.

For example, the vehicle 1 may include a picking unit (such as a picking arm) that performs a picking action for picking a plant, a fruit, a mushroom, or an insect. In this case, upon detection of the monitoring target, the circuitry 13 may control the picking unit to pick the monitoring target. For example, the vehicle 1 may include an exterminating unit (such as a chemical spraying unit) that performs an exterminating action for exterminating a harmful insect. In this case, upon detection of the monitoring target, the circuitry 13 may control the exterminating unit to exterminate the monitoring target. For example, the vehicle 1 may include a removing unit (such as a removing blade) for removing an obstacle such as a rock or fallen tree. In this case, upon detection of the monitoring target, the circuitry 13 may control the removing unit to remove the monitoring target.

Although the initial travel route Ri and travel route Rs illustrated in the above embodiment are set such that the vehicle 1 starts from the starting point Po, patrols the travel area SA (patrol area WA), and finally returns to the starting point Po, the initial travel route Ri and travel route Rs are not limited to those in the above embodiment. A goal point may be set at a location different from the starting point Po, and the initial travel route Ri and travel route Rs may be set such that the vehicle 1 performs alert travel during movement from the starting point Po to the goal point.

The invention claimed is:

1. An autonomous utility vehicle comprising:
   a front wheel;
   a rear wheel;
   a steering structure mounted to the front wheel;
   a drive source that drives the front wheel and/or the rear wheel;
   circuitry that controls the steering structure and drive source to effect autonomous travel without manned operation in a given travel area; and
   a radar or sensor that detects a person or animal in the travel area,
   wherein, when the radar or sensor detects the person or animal during the autonomous travel, the circuitry acquires a location of the autonomous utility vehicle and stores the acquired location of the autonomous utility vehicle as history information of a location of the person or animal,
   wherein the circuitry sets a reference point at the location where the person or animal was detected,
   wherein the circuitry sets a travel route for the autonomous utility vehicle by modifying a predetermined initial travel route to be in a partial region based on the reference point, and
   wherein the autonomous utility vehicle performs given alert travel on the set travel route in the partial region.

2. The autonomous utility vehicle according to claim 1, wherein the circuitry sets the travel route such that the autonomous utility vehicle passes through the reference point and travels according to a given logic in the travel area.

3. The autonomous utility vehicle according to claim 1,
   wherein the reference point is one of a plurality of reference points,
   wherein the circuitry assigns an importance level for setting of the travel route to each of the reference points such that the newer the reference point is, the higher the importance level is, and
   wherein the circuitry sets the travel route around each of the reference points in a different pattern depending on the importance level.

4. The autonomous utility vehicle according to claim 1,
   wherein the reference point is one of a plurality of reference points,
   wherein the circuitry assigns an importance level for setting of the travel route to the partial region such that the greater the number of the reference points in the partial region is, the higher the importance level is, and
   wherein the circuitry sets the travel route around each of the reference points in a different pattern depending on the importance level.

5. The autonomous utility vehicle according to claim 1, wherein the circuitry sets the travel route by modifying the initial travel route such that a travel distance in the partial region is longer on the set travel route than on the initial travel route.

6. An autonomous utility vehicle comprising:
   a front wheel;
   a rear wheel;
   a steering structure mounted to the front wheel;
   a drive source that drives the front wheel and/or the rear wheel;
   circuitry that controls the steering structure and drive source to effect autonomous travel without manned operation in a given travel area; and
   a data receiver that receives detection data from an unmanned air vehicle,
   wherein the unmanned air vehicle includes a radar or sensor that detects a person or animal in the travel area,
   wherein, when the unmanned air vehicle detects the person or animal, the unmanned air vehicle sends detection data to the autonomous utility vehicle, the detection data including a location where the person or animal was detected,
   wherein the data receiver of the autonomous utility vehicle receives the detection data from the unmanned air vehicle,
   wherein the circuitry sets a reference point at the location where the person or animal was detected,
   wherein the circuitry sets a travel route for the autonomous utility vehicle by modifying a predetermined initial travel route based on the reference point, and
   wherein the autonomous utility vehicle travels on the set travel route around the reference point.

7. The autonomous utility vehicle according to claim 6, further comprising an air vehicle takeoff/landing platform from which the unmanned air vehicle takes off and on which the unmanned air vehicle lands.

\* \* \* \* \*